Feb. 28, 1967  T. K. IMHOFF  3,306,647

DETACHABLE HANDLE

Filed March 4, 1965

INVENTOR.
Theodore K. Imhoff

BY

ATTORNEY

United States Patent Office 3,306,647
Patented Feb. 28, 1967

3,306,647
DETACHABLE HANDLE
Theodore K. Imhoff, Painted Post, N.Y., assignor to Corning Glass Works, Corning, N.Y., a corporation of New York
Filed Mar. 4, 1965, Ser. No. 437,247
7 Claims. (Cl. 294—16)

This invention relates to improved detachable handle apparatus, and more particularly to a thumb-operated lock-on detachable handle for culinary utensils.

In the past, it has been known to provide cooking ware with detachable handles, which were secured to the ware by lockably turning a knobular end portion of the handle. Such handles, however, necessitate the use of both hands in order to securely fasten the handle to the ware. Other types of known detachable handles utilize a pliers or squeeze-grip type of attachment which require a continual squeezing pressure between the operating mechanisms of the handle in order to retain a clasping action upon the ware. These types of handles have not been completely satisfactory due to the inherent fatigue which results in the hand of the user after a short duration.

The present invention obviates the disadvantages of the known types of detachable handles by providing an easily operable positive-locking detachable handle which may be applied to a ware article single-handedly by manipulating a thumb piece thereon to positively lock the handle on the ware article.

It thus has been an object of my invention to provide an improved easily operable detachable handle which may be securely locked onto a culinary article.

A further object of my invention has been to provide improved construction in detachable handles which facilitates a single-handed application of the detachable handle to and the removal from a ware article.

A further object of the invention relates to an improved detachable handle having a thumb-operated positive-locking clamp means for lockably securing the handle onto a ware article.

These and other objects of my invention will become more apparent to those skilled in the art from the following disclosure and accompanying drawings in which.

Figure 1:
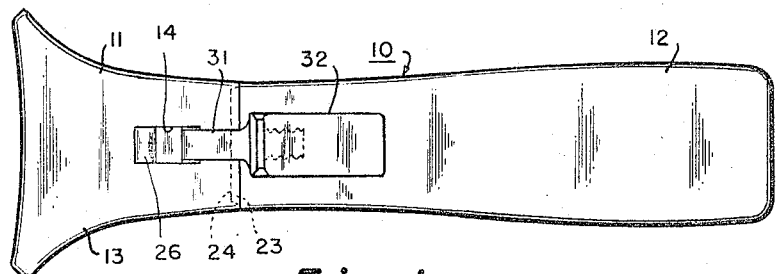
FIGURE 1 is a top plan view of a detachable handle embodying my invention.

Referring now to the drawings, a detachable handle 10 embodying my invention is shown comprising a forward nose or shroud portion 11 and a rearward contoured hand-grasping or handle portion 12. The shroud 11 is preferably made of a suitable metal for strength and rigidity, whereas the handle portion 12 is preferably made of a heat resisting plastic having a configuration which is comfortable to hold.

The shroud 11 has an upper portion 13 provided with an open portion 14 extending therethrough. The forward end of the upper portion 13 flares outwardly and is provided with a downwardly depending lip portion 15. A pair of side skirts or flanges 16 extend downwardly from opposite sides of the upper portion 13, and are provided at their forward ends with inwardly turned ear portions 17.

A channel member 18 suitably secures the shroud portion 11 to the handle portion 12. The channel member 18 has a ramp or wedge portion 19 adjacent its forward end, two pairs of transversely aligned depending flange portions 20 intermediate the longitudinal extent of channel member, and a rearward embeddable bar or attachment portion 21 having a plurality of gripping teeth 22. The channel member is secured to the inner surface of the upper portion 13 of shroud 11 by any suitable means such as welding, soldering, brazing, or adhesive binder, and the rearward embeddable bar or attachment portion 21 is preferably embedded within the handle portion 12. The forward end of the handle portion 12 is provided with a recessed ledge portion 23 for cooperably receiving the rear of the shroud portion 11, and forms a mounting projection 24 which projects within the shroud 11 to provide added rigidity and strength to the handle assembly.

Each flange of the forward pair of transversely-aligned flange portions 20 is provided with an axially aligned pivot opening 25. A freely swingable clamping member 26 having an inclined clamping nose portion 27, a central inverted U-shaped portion 28, and a rearward cam follower portion 29, is pivotally secured between the forward pair of transversely-aligned flanges 20 by means of a pair or trunnions 30 extending outwardly from the U-shaped portion 28 and projecting within and pivotally retained by the axially aligned pivot openings 25. An operating lever 31, having a thumb-operated actuator 32 on its upper end, and a locking cam portion 33 at its lower end, is pivotally mounted between the rear pair of transversely-aligned flange portions 20 by means of a pair of projections 34. The projections 34 extend outwardly from opposite sides of the lever 31 midway between its vertical extent, and are pivotally retained by aligned openings 35 formed in the rear pair of transversely-aligned flange portions 20. An opening 36 is formed in an upper portion of channel member 18 and is in alignment with the open portion 14 formed in the shroud 11. The operating lever 31 projects upwardly through aligned openings 36 and 14, with actuator means 32 on its upper end extending above the handle for easy manipulation.

Figure 2:
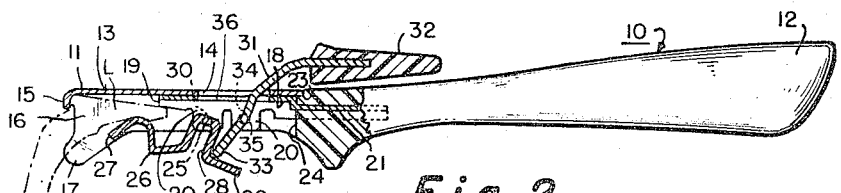
FIGURE 2 is a side elevational view, partially in section, illustrating the handle shown in FIGURE 1 in a locked position on a ware piece shown in chain lines.
Figure 3:
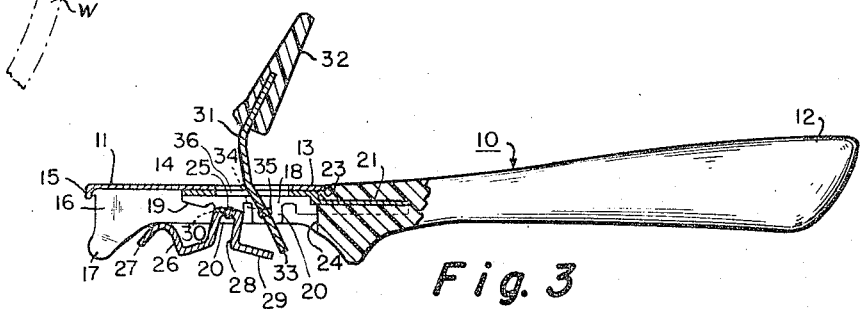
FIGURE 3 is a side elevational view partially in section, similar to FIGURE 2, but illustrating the handle in an open or unlocked position.
Figure 4:
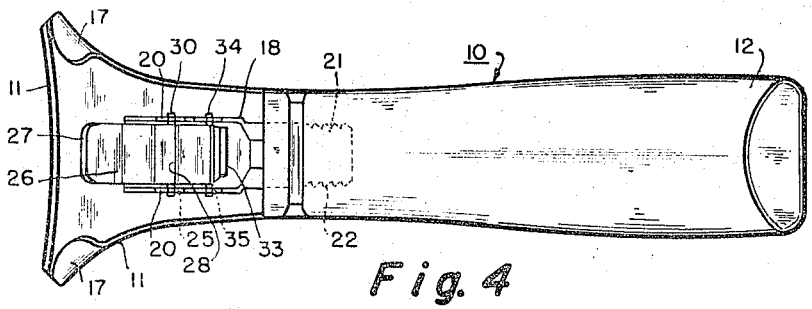
FIGURE 4 is a bottom plan view of the handle shown in FIGURE 3.

In operation, when placed in its open position as shown in FIGURE 3, such as by flipping or pivoting the thumb-actuated portion 32 of the lever 31 upwardly about the projections 34, the inclined nose portion 27 of the clamp member 26 is permitted to swing downwardly about trunnions 30 and thereby facilitate the insertion of an adaptor or handle-receiving lug within shroud portion 11. As shown in FIGURE 2, the upper portion 13 of shroud 11 overlies an adaptor or attachment lug L of a ware article W, with the downwardly extending lip portion 15 cooperably overlying an inner face thereof. In addition, the ear portions 17 curve inwardly under a portion of the lug L and provide load support.

The thumb actuator 32 is then moved downwardly to pivot lever 31 about projections 34 and operatively engage the cam follower portion 29 of the clamping member 26 with the locking cam portion 33, as shown in FIGURE 2. This engagement pivots the inclined clamping nose portion 27 of the clamping member 26 upwardly about trunnions 30 into engagement with a recessed portion formed in the under surface of the lug L. When in such position, the handle 10 is securely clamped and locked on the lug L of the ware article W with the lip portion 15 overlying and bearing upon an inner face of the lug L and the ear portions 17 supportably underlying an under surface thereof. The ramp or wedge portion 19 of the channel member 18 cooperably receives an upper portion of the lug L and functions to not only position the handle in an inclined orientation with respect to the horizontal, but also facilitates a snug fit on the ware article irrespective of their manufacturing tolerances.

When the thumb actuator 32 is moved downwardly, the operating lever 31 is pivoted about projection 34 causing locking cam portion 33 to ride upon the cam follower portion 29 of clamping member 26, which portion is provided with a slight concave curvature. Thus, a downward pressure on the actuator 32 of lever 31 causes the inclined clamping nose portion 27 to close upon an under portion of the lug L, securely fastening such lug within the shroud 11. When the actuator is in such down position as shown in FIGURE 2, the clamping member 26 is in a positively locked position on the lug L and cannot be released therefrom until the actuator is positively forced upwardly, such as through a thumb action. That is, when the locking cam portion 33 is in its locked position upon cam follower portion 29, the pivots 34 of lever 31 are rearwardly of the engagement between the cam follower portion 29 and locking cam portion 33. Accordingly, any increased weight in the ware article results in the lug L imparting a downward force on clamping nose portion 26 which causes the curved cam follower portion 29 of the clamp member 26 to press upwardly against the locking cam portion 33 in such a manner so as to exert a clockwise rotational force on lever 31, as viewed in FIGURE 2, and thereby increase the locking action. However, the handle is easily removable from the ware article by merely lifting the thumb actuator 32 upwardly so as to rotate the lever 31 in a counter-clockwise direction, as viewed in FIGURE 2.

My invention thus provides an improved detachable handle construction having an easily operable thumb-actuated positive-locking mechanism. Further, the handle construction has been strengthened to provide added rigidity and durability while maintaining relative simplicity of operation.

Although I have disclosed the now preferred embodiment of my detachable handle construction, various changes and modification may be made thereto without departing from the spirit and scope thereof as defined in the appended claims.

I claim:

1. An improved detachable handle construction comprising, a forward shroud portion secured to a contoured handle portion, a clamping member pivotally suspended from within said shroud portion, an operating lever pivotally mounted rearwardly of the pivotal suspension of said clamping member, a locking cam portion formed on the lower end of said lever wedgedly engageable with said clamping member forwardly of the pivotal mounting of said lever, said operating lever extending upwardly through an opening in the top of said shroud, and thumb-operated actuator means on said operating lever for pivoting said locking cam portion about said pivotal mounting into and out of a locking engagement with said clamping member provided by said cam portion and said pivotal mounting.

2. An improved detachable handle construction for easy application upon and removal from an attachment lug of a ware article which comprises, a forward shroud portion adapted to overlie upper portions of an attachment lug, a handle portion, and means for rigidly securing said shroud portion to said handle portion; a clamping member pivotally connected intermediate its ends to a portion of said securing means, said clamping member having a forward inclined clamping nose portion engageable with an undersurface of the attachment lug and a rearward cam follower portion; an operating lever pivotally connected to said securing means rearwardly of the clamping member pivot connection, said operating lever having a locking cam portion adjacent its lower end operatively engageable with said cam follower portion to lockably clamp the attachment lug between said shroud and said clamping member, said operating lever extending upwardly through an opening formed in said shroud, and a thumb actuator portion secured to the upper end of said operating lever for moving said locking cam portion into a secure locking engagement with said cam follower portion forwardly of the pivotal connection between said operating lever and said securing means.

3. An improved easily operable lock-on detachable handle comprising, a forward nose portion, a handle portion secured to said nose portion, channel means connecting said nose portion to said handle portion, a clamping member pivotally connected intermediate its end to said channel means, said clamping member having a forward inclined clamping portion and a rearward follower portion, an operating lever extending upwardly through an opening in said nose portion and pivotally connected along an axis parallel to and rearwardly of the pivotal axis of said clamping member, said operating lever having a cam portion adjacent its lower end for lockable engagement with said cam follower portion of said clamping member forwardly of said parallel axis to upwardly cam said forward inclined clamping portion into lockable engagement with a ware article, and means on the upper end of said operating lever for actuating said lever for movement into and out of engagement with said cam follower portion.

4. An improved detachable handle construction for easy application to and removal from an adaptor lug of a ware article which comprises, a forward shroud portion positionable over an adaptor lug, a rearward handle portion, channel means connecting said shroud portion to said handle portion, a clamping member pivotally connected intermediate its ends to said channel means, said clamping member having an inclined clamping nose portion forwardly of said pivotal connection and a cam follower portion rearwardly of said pivotal connection, an operating lever pivotally connected to said channel means rearwardly of said clamping member pivotal connection, a locking cam portion formed on the lower end of said operating lever cooperably engageable with said cam follower portion, an open portion formed through said shroud portion, said operating lever extending upwardly through said open portion, actuating means on an upper end portion of said operating lever for pivoting said lever about its pivotal connection so as to operatively engage said cam follower portion of said clamping member with said locking cam portion and pivot the nose portion of said clamping member upwardly into engagement with the under surface of the adaptor lug, and said pivotal connection between said operating lever and said channel means positioned rearwardly of the engagement between said cam follower portion and said locking cam portion when said locking cam portion is in its locked position to positively lock said clamping member on the adaptor lug.

5. Improved detachable handle construction as defined in claim 4 wherein said shroud is provided with a forward downwardly-extending lip portion adapted to overlie an inner face of the adaptor lug, and a pair of depending side flanges are provided at their forward end with inwardly curved ear portions adapted to underlie portions of the adaptor lug.

6. Improved detachable handle construction as defined in claim 4 wherein said channel means is provided with a forward ramp portion for receiving an upper portion of the adaptor lug to not only position the handle in an inclined orientation with respect to the horizontal but also compensate for manufacturing tolerances present in the adaptor lug.

7. Improved detachable handle construction as defined in claim 5 wherein said channel means has a forward portion fusably bonded to said shroud portion and a rearward portion embedded within said handle portion.

References Cited by the Examiner

UNITED STATES PATENTS

| 1,264,031 | 4/1918 | Dye | 294—31 |
| 1,867,571 | 7/1932 | Jelinek | 294—27 |
| 2,478,784 | 8/1949 | Serio | 294—31 |

(Other references on following page)

| | UNITED STATES PATENTS | | |
|---|---|---|---|
| 3,157,909 | 11/1964 | Schmitt | 294—31 |
| 3,269,765 | 8/1966 | Pryce | 294—31 |

References Cited by the Applicant

UNITED STATES PATENTS

| | | |
|---|---|---|
| 1,578,816 | 3/1926 | Eifried. |
| 2,077,273 | 4/1937 | Serio. |
| 2,162,961 | 6/1939 | Mattoon. |
| 2,229,859 | 1/1951 | McCoy. |
| 2,851,299 | 9/1958 | Serio. |
| 3,065,017 | 11/1962 | Serio. |

M. HENSON WOOD, Jr., *Primary Examiner.*

EVON C. BLUNK, *Examiner.*

J. N. ERLICH, C. H. SPADERNA, *Assistant Examiners.*